United States Patent
Bush et al.

(10) Patent No.: US 10,623,809 B2
(45) Date of Patent: Apr. 14, 2020

(54) CATV RETURN BAND SWEEPING USING DATA OVER CABLE SERVICE INTERFACE SPECIFICATION CARRIER

(71) Applicant: VIAVI SOLUTIONS, INC., San Jose, CA (US)

(72) Inventors: John J. Bush, Bargersville, IN (US); Gary W. Sinde, Indianapolis, IN (US)

(73) Assignee: VIAVI SOLUTIONS, INC., San Jose, CA (US)

( * ) Notice: Subject to any disclaimer, the term of this patent is extended or adjusted under 35 U.S.C. 154(b) by 215 days.

(21) Appl. No.: 14/830,204

(22) Filed: Aug. 19, 2015

(65) Prior Publication Data

US 2016/0057479 A1   Feb. 25, 2016

Related U.S. Application Data

(60) Provisional application No. 62/040,491, filed on Aug. 22, 2014.

(51) Int. Cl.
*H04N 21/437*   (2011.01)
*H04N 21/61*   (2011.01)
*H04N 21/426*   (2011.01)

(52) U.S. Cl.
CPC ..... *H04N 21/437* (2013.01); *H04N 21/42676* (2013.01); *H04N 21/6118* (2013.01); *H04N 21/6168* (2013.01)

(58) Field of Classification Search
CPC . H04N 21/24; H04N 21/2404; H04N 21/2405
USPC .......................................................... 725/107
See application file for complete search history.

(56) References Cited

U.S. PATENT DOCUMENTS

| | | | | |
|---|---|---|---|---|
| 2001/0055319 | A1* | 12/2001 | Quigley | H04L 1/203 370/480 |
| 2006/0230423 | A1* | 10/2006 | Burgett | G07F 17/0014 725/107 |
| 2009/0048835 | A1* | 2/2009 | Masuko | G10L 15/02 704/236 |
| 2009/0125960 | A1* | 5/2009 | Cooprider | H04N 7/173 725/111 |
| 2010/0309805 | A1* | 12/2010 | Jones, Jr. | H04L 12/2801 370/252 |
| 2013/0125183 | A1* | 5/2013 | Gomez | H04N 17/00 725/107 |
| 2014/0344874 | A1* | 11/2014 | Olsen | H04N 17/004 725/107 |

* cited by examiner

*Primary Examiner* — Michael R Telan
(74) *Attorney, Agent, or Firm* — DLA Piper LLP (US)

(57) ABSTRACT

The existing Data Over Cable Service Interface Specification (DOCSIS) carriers generated by field test equipment or by the CATV subscriber modems are used to determine the amplitude response of the return band in a CATV system.

6 Claims, 4 Drawing Sheets

CATV RETURN BAND SWEEPING USING DATA OVER CABLE SERVICE INTERFACE SPECIFICATION CARRIER

CROSS-REFERENCE TO RELATED APPLICATIONS

This application claims the benefit under 35 U. S. C. § 119(e) of the Aug. 22, 2014 filing date of U.S. Ser. No. 62/040,491. The disclosure of U.S. Ser. No. 62/040,491 is hereby incorporated herein by reference.

BACKGROUND

In CATV (hereinafter sometimes cable TV or cable), the return band (hereinafter sometimes upstream) describes the frequency range allocated for transmission of signals from the subscriber premises back to the cable company. In typical designs, this frequency range is from 5 MHz to 42 MHz, 5 MHz to 65 MHz, 5 MHz to 85 MHz, or in the not-too-distant future 5 MHz to 200 MHz (see FIG. 1). Typical signals coming from the subscriber premise include, for example, set top box DVR/On Demand requests, test equipment data channels, and Data Over Cable Service Interface Specification ("DOCSIS") Internet Protocol output cable modem carriers.

As part of performing an installation or servicing a CATV system, it is sometimes necessary to check the linearity in the downstream in CATV systems. In the past, to determine linearity in the downstream, installers and technicians have compared the amplitudes of downstream channels as they installed, or were troubleshooting, a subscriber's installation, and either adjusted the levels accordingly or otherwise determined what was responsible for the amplitude differences and took whatever steps were necessary to correct them.

In the past, to maintain linearity in the upstream in CATV systems, test equipment has transmitted swept carriers upstream to a signal analyzer constructed for this purpose, such as, for example, the Trilithic SST-9581, and monitored these carriers. Again, differences in amplitude were corrected by whatever means were appropriate under the circumstances. The sweep of the carriers had to avoid active upstream channels in the 5 MHz to 42 MHz bandwidth, or 5 MHz to 65 MHz bandwidth, 5 MHz to 85 MHz bandwidth, whichever is being used for upstream communication.

A significant problem with this scheme for the future is that the active upstream bandwidth is filling up with content. As a result, the sweeping carrier cannot appear in many places in the upstream band without risking interfering with upstream-bound signals. There are, however, the active upstream channels themselves.

SUMMARY

According to one aspect, a method for determining the linearity of a CATV return band comprises permitting a cable modem to log in to a Cable Modem Termination System (CMTS); determining the transmit carrier frequency, symbol rate, and level for each active carrier in the return band; determining the transmit carrier ranging error level for each active carrier in the return band; determining the transmit carrier pre-equalizer filter coefficients for each active carrier in the return band; adjusting each active return band carrier level by its ranging error and determining the average transmit level; determining the in-channel response for each active carrier in the return band; and, generating a return band frequency response.

Illustratively according to this aspect, determining the transmit carrier ranging error level for each active carrier in the return band comprises using at least one of the cable modem and the CMTS Simple Network Management Protocol (SNMP) Management Information Base (MIB) to determine the transmit carrier ranging error level for each active carrier in the return band.

Illustratively according to this aspect, determining the transmit carrier pre-equalizer filter coefficients for each active carrier in the return band comprises using the transmit carrier pre-equalizer filter coefficients for each active carrier in the return band from the cable modem to determine the transmit carrier pre-equalizer filter coefficients for each active carrier in the return band.

Illustratively according to this aspect, adjusting each active return band carrier level by its ranging error and determining the average transmit level comprises establishing the average transmit level as the zero reference of the frequency spectrum for the return band.

Illustratively according to this aspect, determining the in-channel response for each active carrier in the return band comprises using the upstream pre-filter coefficients to determine the in-channel response for each active carrier in the return band.

Illustratively according to this aspect, generating a return band frequency response comprises plotting each upstream carrier's in-channel response.

According to another aspect, a method for determining the linearity of a CATV return band comprises constructing a representation of the upstream frequency response using: the cable modems' transmit power for each Data Over Cable Service Interface Specification (DOCSIS) carrier in the return band; the offset error of each DOCSIS carrier in the return band; and, the in-channel pre-equalizer filter coefficients for each DOCSIS carrier in the return band.

BRIEF DESCRIPTION OF THE DRAWINGS

The invention may best be understood by referring to the following detailed description and accompanying drawings which illustrate the invention. The detailed description particularly refers to the following figures, in which.

DETAILED DESCRIPTION OF THE DRAWINGS

Figure 1:
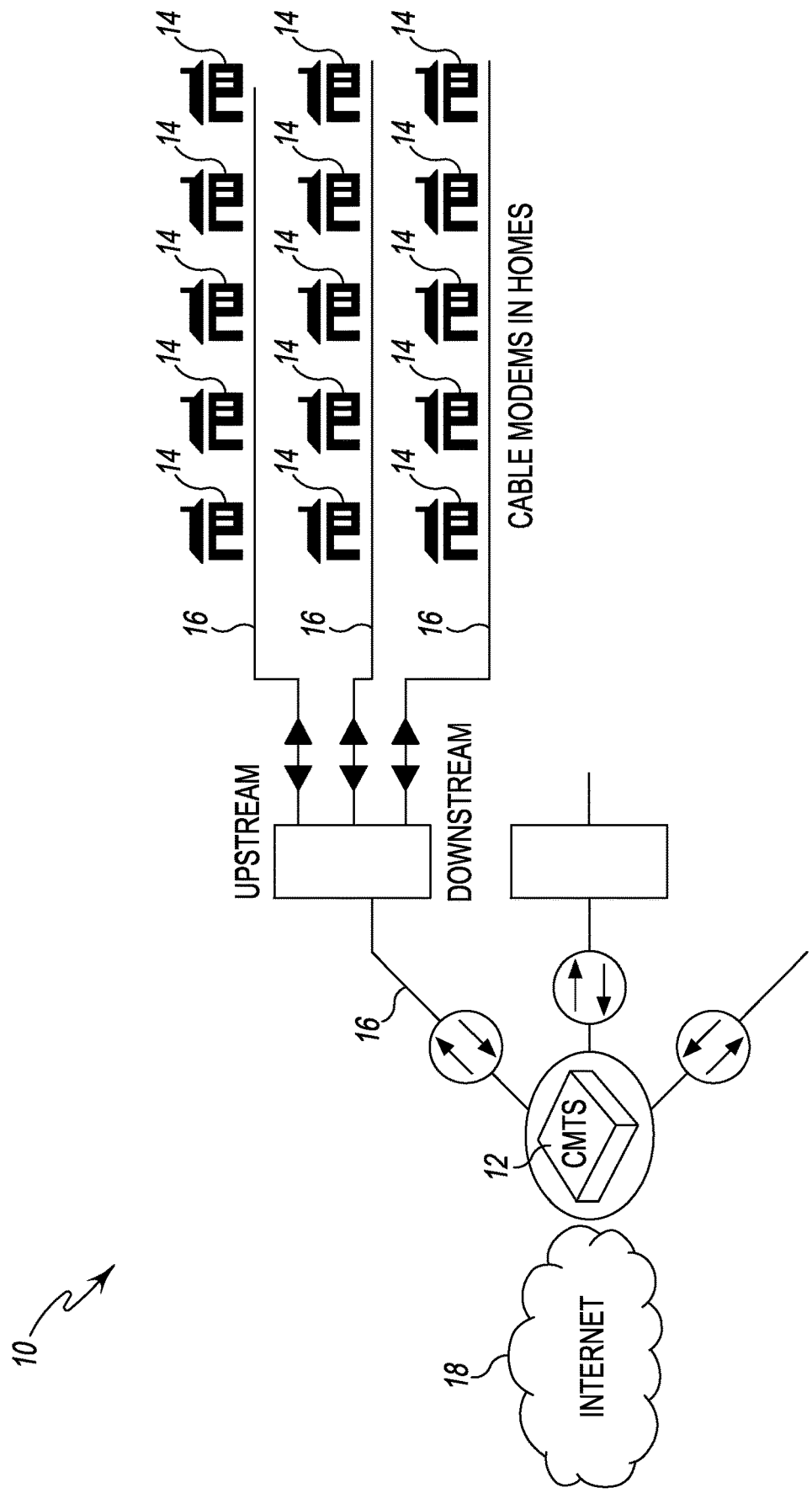
FIG. 1 illustrates a return band containing the frequency range allocated for transmission of signals from the subscriber premises back to the cable company.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

As shown in FIG. 1, a CATV system 10 includes a Cable Modem Termination System (hereinafter sometimes CMTS) 12 that may be located at a cable company's head end or local office. The CMTS 12 communicates with a number of cable modems 14 located in subscribers' homes. The CMTS 12 is connected to the cable modems 14 via a plurality of data lines 16, which may be coaxial or optical fiber cables. The CMTS 12 also communicates with the other components of the CATV system 10 via the Internet 18. To do so, the CMTS 12 is configured to convert signals it receives from each cable modem 14 into Internet Protocol (IP) packets, which are then transmitted over the Internet 18. Transmissions from the cable modems 14 to the CMTS 12 are sometimes referred to as "upstream" transmissions or signals. The CMTS 12 is also configured to send signals "downstream" to the cable modems 14 by processing the signals it receives via the Internet 18 and then transmitting them to the cable modems 14.

The cable system 10 may include any number of "upstream" and "downstream" channels. Currently, cable systems provide either four or eight active upstream channels in the upstream band, but there are plans to provide as many as 8192 upstream channels in the not-too-distant future. Four or eight channels spread out over the upstream bandwidth will give some indication of linearity. Additionally, however, current cable modems include twenty-four channel graphic equalizers, which flatten the Quadrature Amplitude Modulation (hereinafter QAM) frequency response of each channel. The twenty-four graphic equalizer filter coefficients (which are basically the inverse of a filter's transfer function) are available, which permits as many as twenty-four times four or twenty-four time eight points (96 or 192 points) for use in linearizing the upstream bandwidth.

Figure 2:
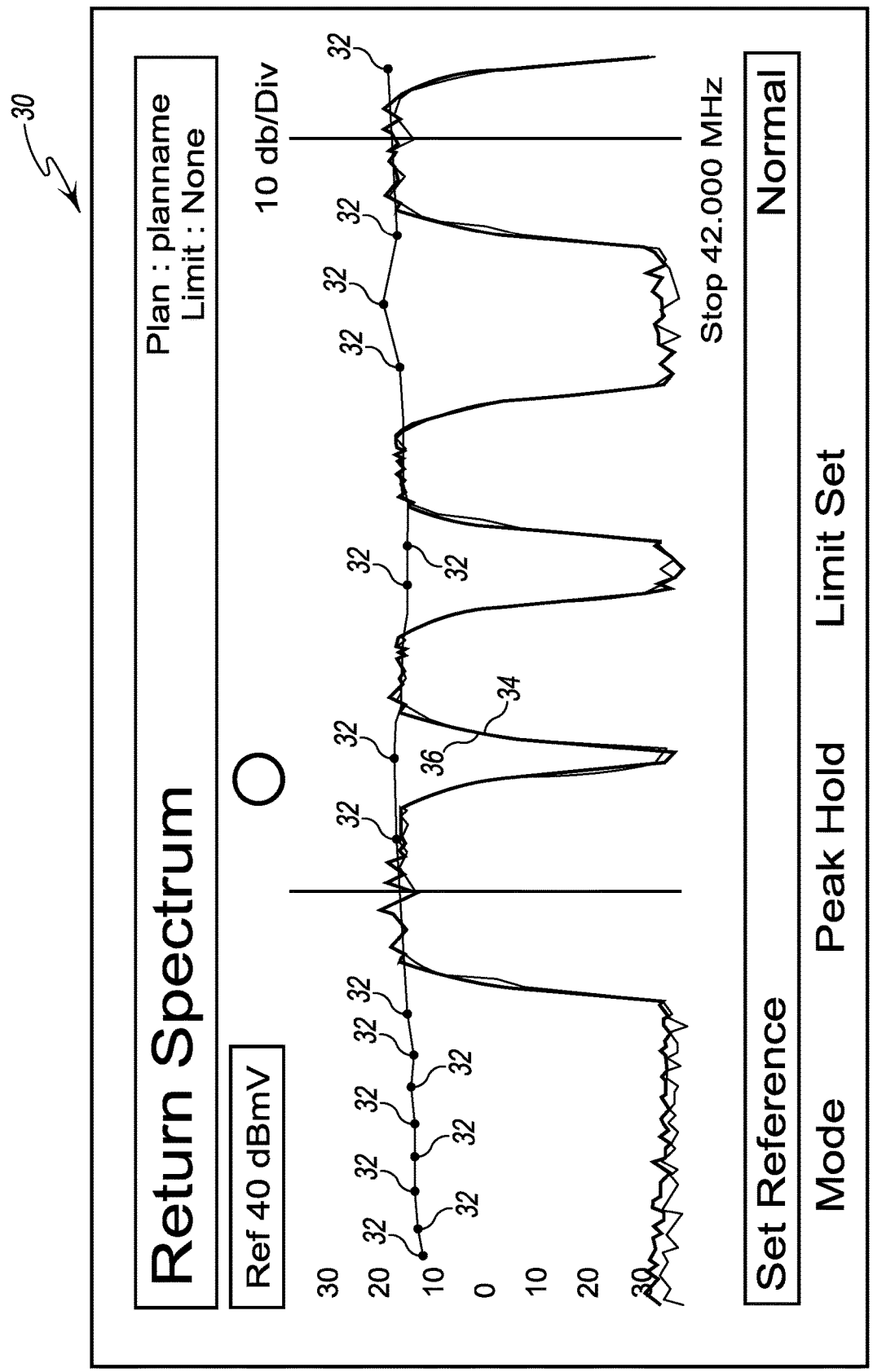
FIG. 2 illustrates the current method used to check for interference and flatness by test equipment manufacturers.

The return band, like any other frequency band allocated for communication, is desired to be as devoid as possible of interference and with minimum amplitude variation. Referring to FIG. 2, the current method 30 used to check for interference and flatness by test equipment manufacturers is to insert test carriers 32 between live signals 34, 36, receive these signals with an analyzer such as, for example, the Trilithic SST-9581, and basically connect the red dots, producing a frequency flatness trace 38. Again, the problem with this method is available bandwidth. As cable system operators attempt to monetize bandwidth by increasing DOCSIS speeds, they place more and more data carriers in the return band, using up the bandwidth available for enough test carriers to make an accurate flatness plot.

Figure 3:
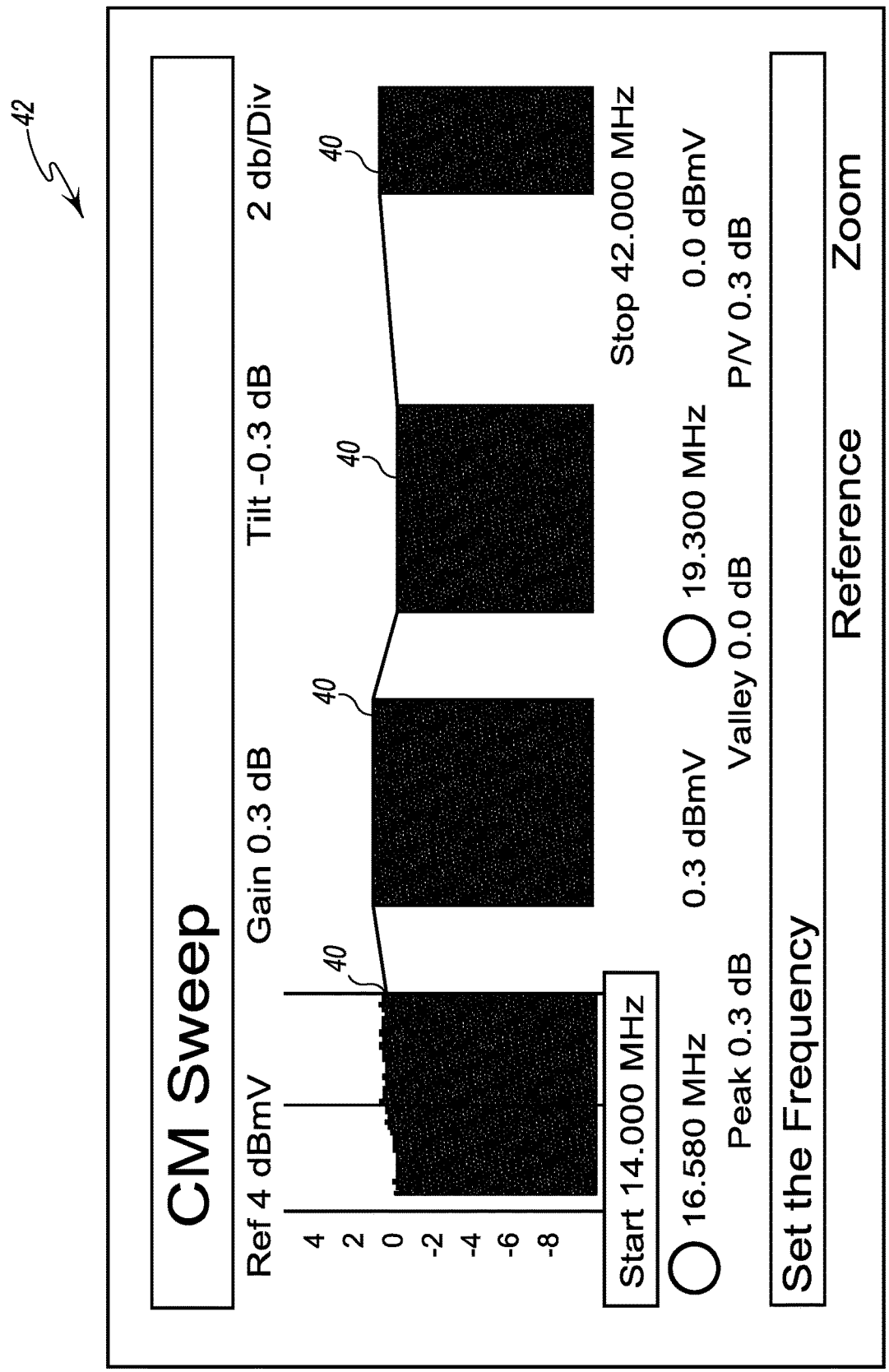
FIG. 3 illustrates a return band, or upstream, sweep using DOCSIS carriers; and, FIG. 4 illustrates a method for using the existing upstream carriers from a cable modem to calculate the linearity of a CATV return band.

This design uses the existing DOCSIS 3.0 (up to 8 carriers) or DOCSIS 3.1 (up to 8192 carriers) carriers generated by field test equipment or by the subscriber modems to discover the amplitude response of the return band. FIG. 3 illustrates a return band, or upstream, sweep using DOCSIS carriers, as described in greater detail below.

When a DOCSIS-compliant cable modem, such as the modems 14 or test equipment containing a cable modem, such as a Trilithic 360 DSP, turns on and logs into the CMTS 12, all carriers used by each modem 14 are controlled so that they are received and measured at the CMTS 12 with equal power levels (typically 0 dBmV). The cable modems 14 have individual carrier level control and always know at what power level they are transmitting upstream.

In the downstream direction, the cable modems 14 are commanded with "ranging messages" from the CMTS 12. These ranging messages command each cable modem 14 to increase or decrease individual carriers' power levels so that they are all received at the CMTS 12 at uniform amplitude. The CMTS 12 continuously commands the cable modems 14 via the ranging messages, adjusting each carrier level (hereinafter sometimes carrier ranging error level). In the case where a signal from a cable modem 14 is not being received at the CMTS 12 at the correct power level (even though the transmit carrier power level is at maximum), the CMTS 12 continuously commands that cable modem 14 to increase its power level by whatever amount is needed to provide the correct received power level. This information enters into the calculations below.

Another method of checking the carrier ranging error level is to request the CMTS 12 for the individual transmit carrier power levels via the Simple Network Management Protocol (hereinafter sometimes SNMP) Management Information Base (hereinafter sometimes MIB) residing in the CMTS 12. This is an SNMP read command through the cable modem 14 to the CMTS 12. It is preferable to read the ranging messages inside the cable modem 14, but these are not always available in all cable modems 14.

The cable modems 14 also use pre-equalization (transmit filter) coefficients to control the in-channel amplitude response (flatness) of the individual carriers. Since the individual carriers are bandwidth-occupying QAM, it is important to control the flatness within the QAM channel. The CMTS 12 measures the frequency response of an individual cable modem QAM carrier. The CMTS 12 then computes the filter coefficients (the previously mentioned 24 data points) that represent an inverted version of this frequency response. These inverse filter coefficients are transmitted down to the cable modem so that the DOCSIS carrier can be adjusted by the inverse frequency shape, that is, equalized, before it is transmitted so that it arrives at the CMTS 12 with minimal in-channel amplitude variation. These filter coefficients can be modified every few seconds to continuously adjust the shape of the transmitted carriers.

Figure 4:
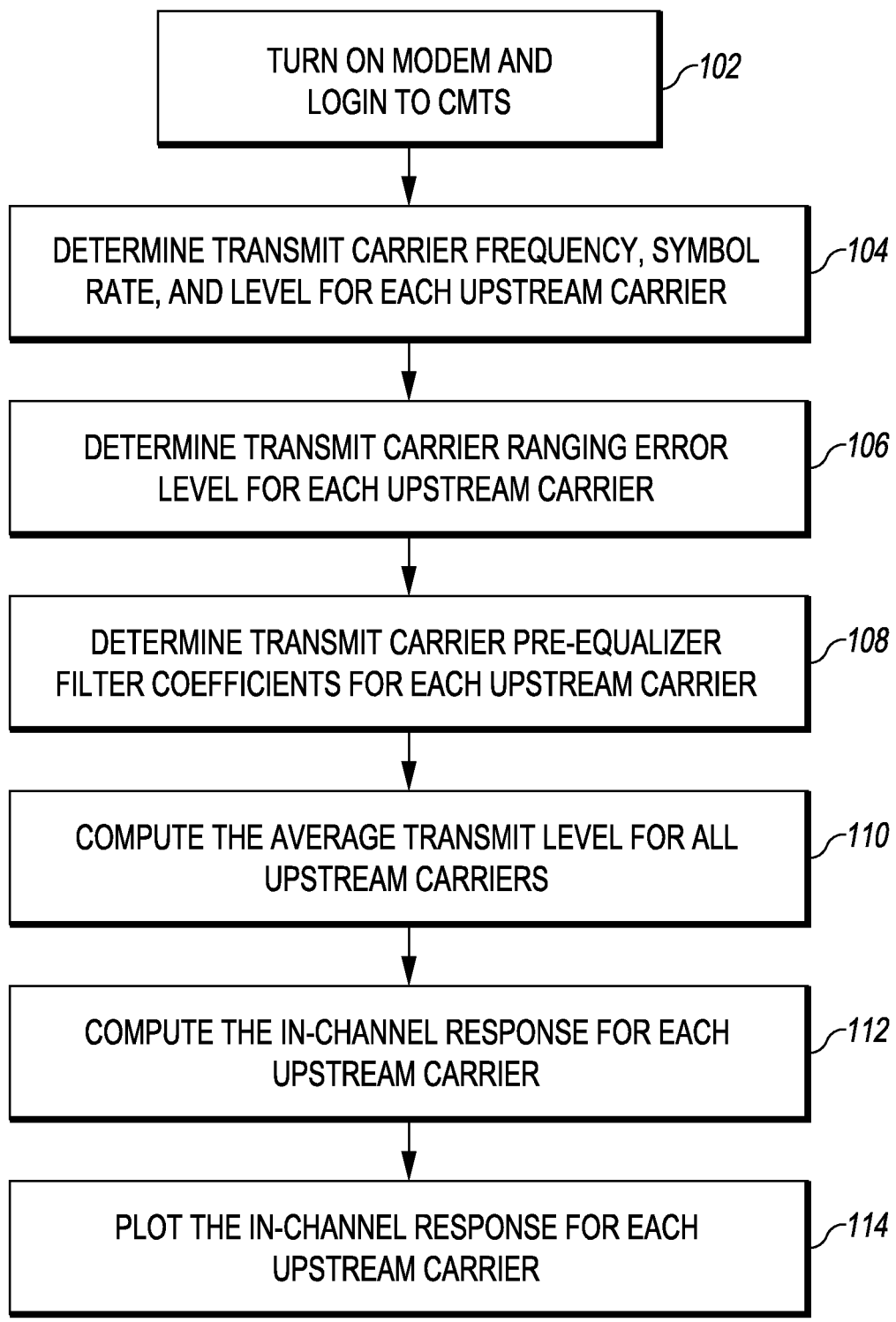

Referring now to FIG. 4, an algorithm or method 100 for using the existing upstream carriers from a cable modem to calculate the linearity of a CATV return band is shown. In block 102, a technician or other user may position a cable modem 14 at a desired location in a subscriber's home or anywhere in the CATV plant. The technician may then turn on a cable modem 14 and allow it to log in to the CMTS 12. The method 100 may then advance to block 104.

In block 104, the technician may read from the cable modem 14 the transmit carrier frequency, symbol rate, and level for each upstream carrier being used. As described above, cable systems provide either four or eight active upstream channels or carriers in the upstream band, but there are plans to provide as many as 8192 upstream channels or carriers in the not-too-distant future. The technician may utilize an analyzer or other piece of test equipment to determine the transmit carrier frequency, symbol rate, and level for each upstream carrier. The method 100 may then advance to block 106.

In block 106, the technician may determine the transmit carrier ranging error level (+/− dB) for each upstream carrier in use. To do so, the technician may use an analyzer to access the transmit carrier ranging error level via the cable modem 14. The transmit carrier ranging error level information is also available via the CMTS 12 through the Simple Network Management Protocol Management Information Base or SNMP MIB.

The method 100 may then advance to block 108 in which the technician may determine the transmit carrier pre-equalizer filter coefficients for each upstream carrier in use. To do so, the technician may again use an analyzer to access the information via the cable modem 14. It should be appreciated that blocks 102, 104, 106, and 108 have been described as separate steps for discussion purposes only and that in other embodiments the tasks performed in those blocks or any of the blocks of the method 100 may be performed contemporaneously or automatically.

At the completion of block 108, the method may advance to block 110 in which the technician offsets each upstream carrier level of the cable modem 14 by its ranging error. As described above, the upstream carrier levels are determined in block 104 and the ranging error for each upstream carrier is determined in block 106. Using that information, the technician may then compute the average transmit level for all of the carriers. This average level will become the zero reference on the graph shown in, for example, FIG. 3.

The method may then advance to block 112 in which the technician uses the upstream pre-filter coefficients identified in block 108 to compute the in-channel response for each cable modem upstream carrier. The 24 equalizer data points can be processed through an FFT of reasonable size, for example, 32 points, providing 32 output points separated by the symbol rate of the carrier divided by 32, $f_{sym}/32$. This FFT output can then be normalized around zero and offset by the average transmit level calculated in block 110.

In block 114, the technician may plot each upstream carrier's in-channel response 40 for a frequency spectrum view 42 of the return band's frequency response, as shown in FIG. 3. By using the transmit power of the cable modem 14 for each DOCSIS carrier in the return band, the offset error of each DOCSIS carrier in the return band, and the in-channel pre-equalizer filter coefficients for each DOCSIS carrier in the return band, an accurate representation of the upstream frequency response can be constructed.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. For example, the two disclosed methods could be combined for complete spectral coverage.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

What is claimed is:

1. A method for determining the linearity of a CATV return band comprising:
   energizing a cable modem at a subscriber's premises to log in to a Cable Modem Termination System (CMTS) and generate a plurality of active carriers in the CATV return band, each active carrier being a DOCSIS-compliant carrier;
   energizing a signal analyzer at the subscriber's premises to receive data from the cable modem;
   determining, with the signal analyzer, the transmit carrier frequency, symbol rate, and level for each active carrier of the plurality of active carriers in the CATV return band;
   accessing, with the signal analyzer, a transmit carrier ranging error level for each active carrier of the plurality of active carriers in the CATV return band via the cable modem;
   accessing, with the signal analyzer, a corresponding number of transmit carrier pre-equalizer filter coefficients that represent an inverted frequency response for each active carrier of the plurality of active carriers in the CATV return band via the cable modem;
   adjusting each active carrier of the plurality of active carriers using the corresponding filter coefficient to minimize in-channel amplitude variation;
   adjusting a carrier level for each active carrier of the plurality of active carriers by its ranging error and determining an average transmit level for all of the active carriers;
   updating a graphical display based on the average transmit level;
   determining the in-channel response for each active carrier of the plurality of active carriers in the return band;
   generating a return band frequency response at the subscriber's premises using the in-channel response for each active carrier of the plurality of active carriers in the return band, wherein generating the return band frequency response comprises plotting, for each active carrier of the plurality of active carriers, each active carrier's in-channel response on the updated graphical display, and
   comparing the active carrier in-channel responses to identify any differences in amplitude and determine the linearity of the CATV return band.

2. The method of claim 1, wherein adjusting the carrier level for each active carrier of the plurality of active carriers by its ranging error and determining the average transmit level comprises establishing the average transmit level as the zero reference of the frequency spectrum for the CATV return band.

3. The method of claim 1 wherein determining the in-channel response for each active carrier of the plurality of active carriers in the CATV return band comprises using upstream pre-filter coefficients to determine the in-channel response for each active carrier of the plurality of active carriers in the return band.

4. The method of claim 1, wherein energizing a cable modem to log in to the Cable Modem Termination System (CMTS) and generate the plurality of active carriers in the CATV return band comprising connecting a test instrument comprising the cable modem to a data line at the subscriber's premises and energizing the test instrument.

5. The method of claim 1, further comprising correcting any difference in amplitude in the return band frequency response to improve the linearity of the CATV return band.

6. The method of claim 1, further comprising connecting a test instrument include the cable modem and the signal analyzer to a data line at the subscriber's premises.

* * * * *